(12) United States Patent
Willis

(10) Patent No.: US 6,781,257 B1
(45) Date of Patent: Aug. 24, 2004

(54) APPARATUS FOR REDUCING NOISE FROM MULTIPLE SWITCHING REGULATORS

(75) Inventor: Scott C. Willis, Fairfax Station, VA (US)

(73) Assignee: BAE Systems, Information and Electronic Systems Integration, Inc., Nashua, NH (US)

( * ) Notice: Subject to any disclaimer, the term of this patent is extended or adjusted under 35 U.S.C. 154(b) by 0 days.

(21) Appl. No.: 10/439,396

(22) Filed: May 16, 2003

(51) Int. Cl.[7] .................................................. H02J 1/00
(52) U.S. Cl. ......................................................... 307/77
(58) Field of Search ............................. 307/77, 43, 82, 307/96, 105; 327/552, 553

(56) References Cited

U.S. PATENT DOCUMENTS 5,506,456 A * 4/1996 Yang .......................... 307/81

* cited by examiner

*Primary Examiner*—Shawn Riley
(74) *Attorney, Agent, or Firm*—Daniel J. Long; Antony P. Ng; Dillon & Yudell LLP

(57) ABSTRACT

An apparatus for reducing switching regulator noise from outputs of multiple switching regulators is disclosed. The apparatus includes an operational amplifier, an capacitor, a resistor and a pair of diodes. The switching regulators are connected in series to provide a positive output rail and a negative output rail. The output of the operational amplifier in connected to an inverting input of the operational amplifier and a positive sensing input of one of the switching regulators. The non-inverting input of the operation amplifier is connected to the positive output rail of one of the switching regulator via the capacitor. The resistor is connected between a positive voltage output of one of the switching regulators and the capacitors. The pair of diodes is connected between the positive voltage output of one of the switching regulators and the negative output rail of the switching regulators.

4 Claims, 1 Drawing Sheet

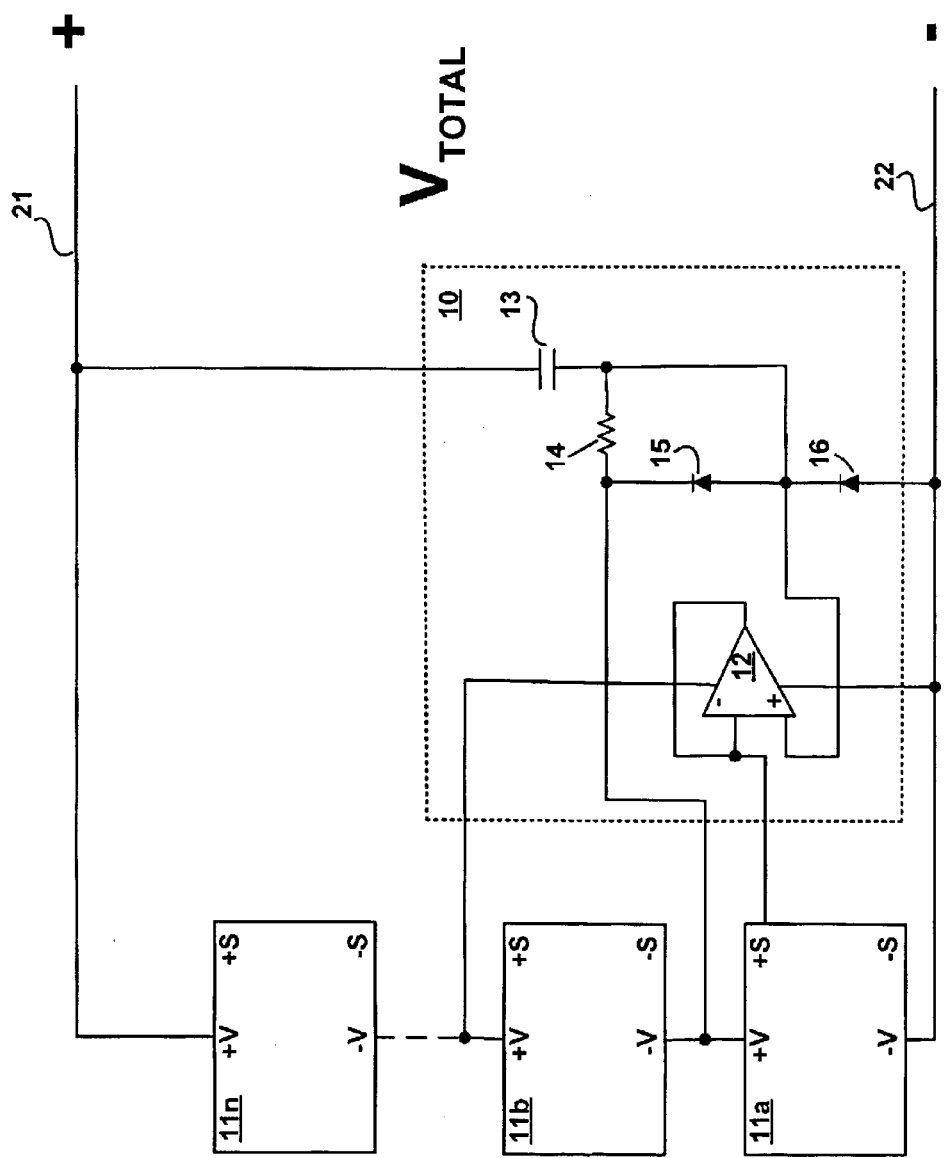

US 6,781,257 B1

APPARATUS FOR REDUCING NOISE FROM MULTIPLE SWITCHING REGULATORS

BACKGROUND OF THE INVENTION

1. Technical Field

The present invention relates to power supplies in general, and in particular to switching regulators. Still more particularly, the present invention relates to an apparatus for reducing noise from a group of switching regulators.

2. Description of the Related Art

Switched mode power supplies are commonly employed in many of today's electronic devices due to their high efficiency and good output power regulation. Generally speaking, a switched mode power supply converts a low-frequency (e.g., 50 or 60 Hz mains frequency), high-voltage alternating current (AC) to a high-frequency (e.g., 30 to 300 kHz) AC, using a switched mode power supply control circuit. Next, the high-frequency, high-voltage AC is applied to a transformer to transform the voltage, usually to a lower voltage, and to provide safety isolation. The output of the transformer is rectified to provide a regulated direct current (DC) output, which may be used to power an electronic device. The switched mode power supply control circuit usually provides output regulation by sensing the output and controlling it in a closed loop.

A switched mode power supply may include an integrated circuit switching regulator having a power switch or transistor coupled in series with a primary winding of a transformer. Energy is transferred to a secondary winding of the transformer by turning the power transistor on and off in a manner controlled by the switching regulator to provide a clean and steady source of power at the DC output. A switching regulator samples a feedback current from the output of the DC output of the power supply. When the feedback current is below a regulation threshold, the power transistor is switched by the switching regulator at a constant frequency.

In many applications that contain sensitive circuits, it is important to minimize the noise from a switching regulator in order to maintain a relatively high signal-to-noise ratio. The switching regulator noise is sometimes referred to as the beat frequency noise, since it is the result of the sum and difference of individual switching regulator noise. One contributor to switching regulator noise is from the difference in switching frequencies among multiple switching regulators. For example, a first switching regulator operates at 100 kHz and a second switching regulator operates at 98 kHz will yield switching regulator noise at 2 kHz.

Prior art solutions for handling switching regulator noise include external linear post-regulators and synchronization of DC/DC converter clocks, but those solutions are not very satisfactory. Consequently, it is desirable to provide an apparatus for reducing switching regulator noise from multiple switching regulators.

SUMMARY OF THE INVENTION

In accordance with a preferred embodiment of the present invention, an apparatus for reducing switching regulator noise from outputs of multiple switching regulators includes an operational amplifier, an capacitor, a resistor and a pair of diodes. The switching regulators are connected in series to provide a positive output rail and a negative output rail. The output of the operational amplifier in connected to an inverting input of the operational amplifier and a positive sensing input of one of the switching regulators. The non-inverting input of the operation amplifier is connected to the positive output rail of one of the switching regulator via the capacitor. The resistor is connected between a positive voltage output of one of the switching regulators and the capacitors. The pair of diodes is connected between the positive voltage output of one of the switching regulators and the negative output rail of the switching regulators.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 1 is a block diagram of an apparatus for reducing noise from the outputs of a group of switching regulators, in accordance with a preferred embodiment of the present invention.

DETAILED DESCRIPTION OF A PREFERRED EMBODIMENT

Referring now to the drawings and in particular to FIG. 1, there is illustrated a block diagram of an apparatus for reducing noise from the outputs of a group of switching regulators, in accordance with a preferred embodiment of the present invention. As shown, a group of voltage regulators 11a–11n are connected in series to generate a total output voltage $V_{total}$ via a positive power rail 21 and a negative power rail 22. The total output voltage $V_{total}$ is an aggregate of the individual voltages of each of voltage regulators 11a–11n. For example, if the voltage of each of voltage regulators 11a–11n is 12 V, and if there is a total of ten voltage regulators 11a–11n, then the total output voltage $V_{total}$ is 120 V.

Voltage regulators 11a–11n are switching regulators (i.e., DC output also contains high frequency noise related to switching frequency). Each of voltage regulators 11a–11n contains resistors (not shown), typically on the order of 100 ohms, between voltage output terminals +V or −V and remote sensing leads +S or −S, respectively. Remote sense leads +S and −S allow for local voltage sensing if remote sensing is not used.

A noise reduction apparatus 10 is connected between positive power rail 21 and negative power rail 22 of voltage regulators 11a–11n for reducing noise (or voltage ripples) from the voltage output $V_{total}$ of voltage regulators 11a–11n. Noise reduction apparatus 10 includes an operational amplifier 12, a capacitor 13, a resistor 14, and diodes 15–16.

The output of operational amplifier 12 is connected to an inverting input of operational amplifier 12 and a remote sensing lead +S of voltage regulator 11a. A non-inverting input of operational amplifier 12 is connected to a node between diodes 15–16, which is also connected to positive power rail 21 via capacitor 13. A voltage output terminal +V of voltage regulator 11a is connected to positive power rail 21 via resistor 14 and capacitor 13. Voltage output terminal +V of voltage regulator 11a is also connected to negative power rail 22 via diodes 15–16.

Operational amplifier 12 is configured as a unity gain buffer. Preferably, operational amplifier 12 is biased in the middle of power rails 21 and 22 for maximum dynamic range. As shown, the negative biasing input of operational amplifier 12 is connected to voltage output terminal +V of switching regulator 11b. On the other hand, the positive biasing input of operational amplifier 12 is connected to voltage output terminal −V of switching regulator 11a. Diodes 15–16 provide input protection for operational amplifier 12 during transient conditions. Capacitor 13 provides AC coupling and DC blocking. Resistor 14 provides proper biasing and determines low frequency cutoff along with capacitor 13.

In addition, since remote sensing lead +S of voltage regulator 11a is connected to an inverting input of operational amplifier 12 that compares the remote sensing lead +S of voltage regulator 11a to a DC reference, any noise on the top input bus is coupled to operational amplifier 11 and is fed to remote sensing lead +S of voltage regulator 11a. Voltage regulator 11a adjusts its output to correct for such noise.

The circuit shown in FIG. 1 reduces noise within the frequency response bandwidth of voltage regulators 11a–11n. Since the maximum gain through unity gain operational amplifier 12 and RC filter (i.e., resistor 14 and capacitor 13) is one, there are no adverse effects to control loop stability. The key concept is that noise reduction apparatus 10 allows for much smaller value of capacitance for the same low frequency cutoff since resistor 14 can be made much larger than 100 ohms resistors that are typically found within conventional voltage regulators.

It is understood by those skilled in the art that many variations can be applied to the preferred embodiment of the present invention, as shown in FIG. 1. For example, circuit can be applicable to both negative and positive ground reference. Circuit can be located at top or bottom of string. The $V_{cc}$ bias for operational amplifier 12 can be provided at appropriate string tap points.

As has been described, the present invention provides an apparatus for reducing noise from the voltage output of a group of switching regulators. The noise reduction apparatus of the present invention is compatible with commercial switching regulators that do not have external clock synchronization capability. Also, the noise reduction apparatus of the present invention has fewer components and is more efficient than adding linear regulators.

While the invention has been particularly shown and described with reference to a preferred embodiment, it will be understood by those skilled in the art that various changes in form and detail may be made therein without departing from the spirit and scope of the invention.

What is claimed is:

1. An apparatus for reducing noise from outputs of a plurality of switching regulators, wherein said plurality of switching regulators are connected in series to provide a positive output rail and a negative output rail, said apparatus comprising:

a capacitor;

an operational amplifier having an output connected to an inverting input of said operational amplifier and a positive sensing input of one of said plurality of switching regulators, wherein said operational amplifier includes a non-inverting input connected to said positive output rail of said plurality of switching regulators via said capacitor;

a resistor connected between a positive voltage output of said one of said plurality of switching regulators and said capacitor; and a pair of diodes connected between said positive voltage output of said one of said plurality of switching regulators and said negative output rail of said plurality of switching regulators.

2. The apparatus of claim 1, wherein said non-inverting input of said operational amplifier is connected to a node between said pair of diodes.

3. The apparatus of claim 1, wherein said operational amplifier is configured as a unity gain buffer.

4. The apparatus of claim 1, wherein said operational amplifier is biased in the middle of said positive and negative output rails.

* * * * *